US008203959B2

(12) United States Patent
Liao et al.

(10) Patent No.: US 8,203,959 B2
(45) Date of Patent: Jun. 19, 2012

(54) APPARATUS FOR REMOTELY MANAGING NETWORK ELEMENTS OF A VOIP COMMUNICATION SYSTEM AND AN ASSOCIATED METHOD AND COMPUTER PROGRAM PRODUCT

(75) Inventors: Robert H. Liao, Chesnut Hill, MA (US); Rezwanul Azim, Lexington, MA (US); Elliot Eichen, Arlington, MA (US); Juan Vasquez, Gibsonton, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1339 days.

(21) Appl. No.: 11/613,701

(22) Filed: Dec. 20, 2006

(65) Prior Publication Data

US 2008/0151878 A1    Jun. 26, 2008

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ........ 370/252; 370/241; 370/351; 370/352; 370/353; 370/354; 370/355; 370/356; 709/223; 709/224

(58) Field of Classification Search ................... None
See application file for complete search history.

(56) References Cited

U.S. PATENT DOCUMENTS

| 7,042,880 | B1 * | 5/2006 | Voit et al. | 370/395.1 |
|---|---|---|---|---|
| 2003/0224781 | A1 * | 12/2003 | Milford et al. | 455/426.1 |
| 2004/0022237 | A1 * | 2/2004 | Elliott et al. | 370/356 |
| 2006/0050683 | A1 * | 3/2006 | Wall et al. | 370/352 |
| 2007/0041558 | A1 * | 2/2007 | Parayil et al. | 379/219 |
| 2008/0049623 | A1 * | 2/2008 | Qiu et al. | 370/241 |
| 2008/0062962 | A1 * | 3/2008 | Luck et al. | 370/352 |

* cited by examiner

*Primary Examiner* — Jae Y Lee

(57) ABSTRACT

An apparatus is provided for remotely managing various network elements of a Voice over Internet Protocol (VoIP) communication system. In general, an apparatus is described for communicating with different network elements of a VoIP communication system, receiving data from each network element, and storing the data. The apparatus includes a processor that communicates with different network elements of a VoIP communication system over a packet-switching network and queries the network elements for particular information. The processor receives and stores the data regarding each network element. In this way, data from multiple different network elements of a VoIP communication system may be remotely accessed and stored, and the data may be analyzed or manipulated to address system problems or monitor conditions of the system from the remote location. A method and computer program product are also provided for remotely managing various network elements of a VoIP communication system.

26 Claims, 9 Drawing Sheets

Vo p MD

VoIP Phone Inventory

Home | Go to Search Page | Current Search is: Last Name = Account

5 lines found

| First Name | Last Name | Room | City | Department | Primary TN | MAC | Line | Label | TN | Lineport |
|---|---|---|---|---|---|---|---|---|---|---|
| Test | Account | Office | Best City | DEPT | 0000000000 | 00001a1000000 | 1 | 0000000000 | 0000000000 | 0000000000 1 |
| Test | Account | Office | Best City | DEPT | 0000000000 | 00001a1000000 | 1 | 0000000000 | 0000000000 | 0000000000 1 |
| Test | Account | Office | Best City | DEPT | 0000000000 | 00001a1000000 | 1 | 0000000000 | 0000000000 | 0000000000 1 |
| Test | Account | Office | Best City | DEPT | 0000000000 | 00001a1000000 | 1 | 0000000000 | 0000000000 | 0000000000 1 |
| Test | Account | Office | Best City | DEPT | 0000000000 | 00001a1000000 | 1 | 0000000000 | 0000000000 | 0000000000 1 |

Home | Advanced Search | Toolbox

Fig. 6

APPARATUS FOR REMOTELY MANAGING NETWORK ELEMENTS OF A VOIP COMMUNICATION SYSTEM AND AN ASSOCIATED METHOD AND COMPUTER PROGRAM PRODUCT

BACKGROUND

Voice over Internet Protocol (VoIP) provides for the conversion of analog audio signals, such as voice signals, into digital data that can be transmitted over a packet-switching network. In contrast, Time-Division Multiplexing (TDM) is a method for transferring data as sub-channels in one communication channel. Whereas a TDM system uses a dedicated path having a fixed number of channels with a constant bandwidth for circuit mode communication, a VoIP system routes the data in packets along different paths.

VoIP communication systems are becoming more prevalent in enterprises, replacing typical TDM telephone systems. In particular, large enterprises with multiple distributed facilities may find huge cost benefits from transporting voice traffic over the existing data network infrastructure through VoIP. In addition to simplified infrastructure, VoIP also presents other advantages over traditional telephone systems, such as the ability to manipulate the voice data and to use a VoIP telephone in most locations having access to the network.

VoIP communication systems also present unique challenges in comparison to traditional telephone systems. VoIP devices generally require more maintenance and monitoring than typical TDM devices. For example, VoIP telephones may need to periodically download data from a central server on the network, such as profile information and software updates, or simply reset themselves to clear an error condition.

In addition, the more sophisticated technology associated with VoIP communication systems presents new challenges with regards to monitoring, diagnosing, and updating the various network elements involved with transmitting VoIP data from one subscriber to another. For example, the voice signals from a subscriber who places a phone call from one location using a VoIP communication system must pass through and be processed by several different elements of the network as they are routed to another subscriber at a different location. Such network elements may include Call Agents, Session Initiation Protocol (SIP) Servers, SIP Clients, Service Brokers, Application Servers, Media Servers, Signaling Gateways, Trunking Gateways, Access Gateways, Access Concentrators, Bandwidth Managers, Edge Routers, Subscriber Gateways, Bridges, Routers, and VoIP communication devices, to name a few. Thus, a problem with the transmission of VoIP signals from one subscriber to another may have several potential causes that should be investigated, depending on how many intervening network elements exist between the two communicating subscribers.

Furthermore, at least some network elements may communicate according to a different signal protocol or format, making the task of obtaining information from each network element in an effort to diagnose a problem or determine the condition of the network even more complicated. For example, File Transfer Protocol (FTP) may be required to obtain call log data from some network elements, Secure Shell (SSH) or Telnet may be required to obtain registration and device status information from other network elements, and still other network elements may require the use of proprietary interfaces to obtain the requisite information.

As a result, the task of monitoring, diagnosing, and updating network elements supporting VoIP communication devices in a large enterprise distributed across multiple sites may involve substantial costs and time investment. Determining which network element to query for which information using which protocol typically requires technically skilled personnel with knowledge on how to access and communicate with the different elements of the network architecture. In addition, each problem that the technicians encounter may require long and thorough investigations to discover the root cause of the problem and the appropriate solution, as multiple network elements must be queried manually for particular data, the obtained data must be arranged appropriately, and the results must be analyzed.

BRIEF DESCRIPTION OF THE SEVERAL VIEWS OF THE DRAWING(S)

FIG. 6 shows an example of a screen showing results of a search generated by execution of a computer program product in accordance with one embodiment;

DETAILED DESCRIPTION OF PREFERRED EMBODIMENTS

Exemplary embodiments now will be described hereinafter with reference to the accompanying drawings, in which exemplary embodiments and examples are shown. Like numbers refer to like elements throughout.

Apparatuses and methods for remotely managing different network elements of a Voice over Internet Protocol (VoIP) communication system are provided in accordance with various exemplary embodiments. In general, apparatuses and methods are described for communicating with different network elements of a VoIP communication system, receiving data from each network element, and storing the data. A processor communicates with different network elements of a VoIP communication system over a packet-switching network and queries the network elements for particular information. The processor receives and stores the data regarding each network element. In this way, data from multiple different network elements of a VoIP communication system may be remotely accessed and stored, and the data may be analyzed or manipulated to address system problems or monitor conditions of the system from the remote location.

Figure 1:
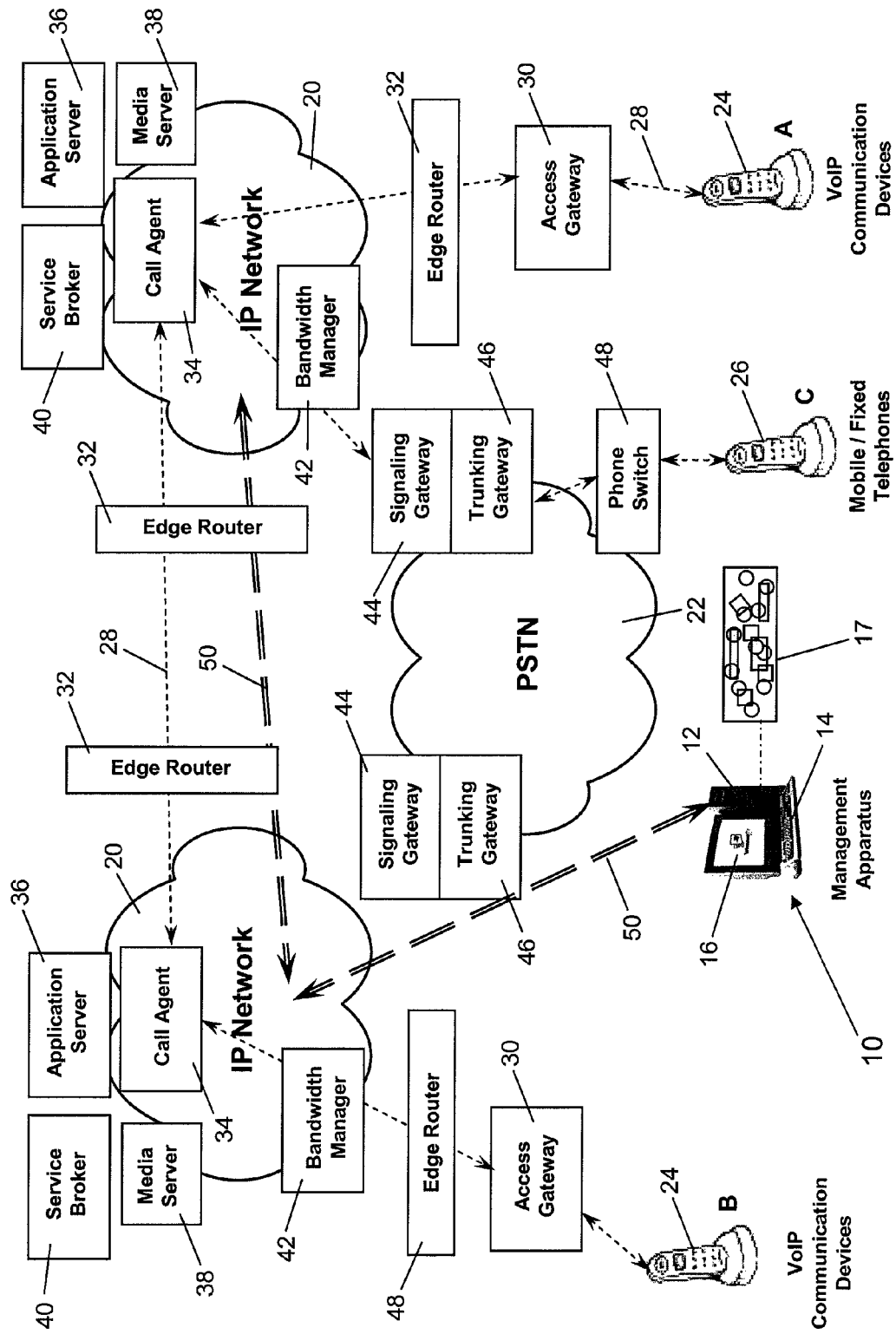
FIG. 1 is a schematic representation of one embodiment of an apparatus for remotely managing network elements of a VoIP communication system.

Referring to FIG. 1, the apparatus 10 comprises a processor 12 configured to communicate with a plurality of different network elements of a VoIP communication system. The processor may be a microprocessor, a personal computer, or any other computing device capable of performing the functions subscribed to the processor hereinbelow. The network elements with which the processor 12 is configured to communicate may include various servers, routers, gateways, and other systems and may be configured in numerous ways to support a VoIP communication system. For example, FIG. 1 illustrates one configuration of a VoIP communication system that includes two Internet Protocol (IP) networks 20, each of which may be serviced by a different service provider, located at different offices or sites of a business, etc., and a Public Switched Telephone Network (PSTN) 22. The IP Networks 20 may provide VoIP service to various connected VoIP communication devices 24, such as traditional phones connecting to the VoIP network via analog telephone adapters, IP phones, or computers running appropriate software to enable the connection. The PSTN 22 in this example is a TDM-based circuit-switched telephone network that may provide analog or digital service to traditional mobile or fixed telephones 26.

For example, in FIG. 1, Subscriber A using a VoIP communication device 24 may wish to call Subscriber B, who is also using a VoIP communication device 24. Unlike a traditional circuit-switched telephone network, in which a fixed connection would be established between Subscriber A and Subscriber B, in a VoIP communication system packets of information are routed from Subscriber A to Subscriber B along potentially different pathways.

As signals are routed from A to B, various network elements encounter the signals and support the communication in different ways. The VoIP communication device 24 used by Subscriber A may convert subscriber A's communication 28, represented by a single dashed line, for example Subscriber A's voice, into digital signals that are transmitted from the VoIP communication device 24 to an Access Gateway 30. The Access Gateway 30 may provide support for Plain Old Telephone Service (POTS) phones and is typically under the control of the Call Agent 34 or Media Gateway Controller through a device control protocol such as H.248 (Megaco) or MGCP. From the Access Gateway 30, the communication 28 may be transmitted to an Edge Router 32. The Edge Router 32 routes IP traffic onto the IP network 20 and may provide other functions, such as terminating the service provider end of Wide Area Network (WAN) links.

A Call Agent 34 may provide call logic and call control functions, typically maintaining call state for every call in the network. Some Call Agents 34 may also provide service logic for supplementary services such as Caller ID and Call Waiting and may also interact with Application Servers 36 to supply services that are not directly hosted on the Call Agent 34, such as voice mail or conference calling facilities. The Call Agent 34 may participate in signaling and device control flows originating, terminating, or forwarding messages and produce details of each call to support subscriber billing. The Call Agent 34 may operate according to one of several communication protocols, including SIP, SIP-T, H.323, BICC, H.248, MGCP/NCS, SS7, AIN, ISDN, and others. A network may have a SIP Server or SIP Client instead of a Call Agent 34 to provide the equivalent functions of a Call Agent 34 in a SIP signaling network.

In addition to an Application Server 36, the Call Agent 34 may also interface with Media Server 38 to provide various functions, such as playing announcements, providing support for 3-way calling, tone detection and generation, interactive voice response (IVR) processing, and fax processing. For voice services, the Media Server 38 may use a control protocol, such as H.248 (Megaco) or MGCP, under the control of the Call Agent 34 or Application Server 36.

A Service Broker 40 may be located on the edge of the IP network 20 to provide the service distribution, coordination, and control between Application Servers 36, Media Servers 38, Call Agents 34, and services that may exist on other technologies, such as Parlay Gateways and Service Control Points (SCPs). A Bandwidth Manager 42 may also be located in the IP network 20 to provide the required Quality of Service (QoS) from the network. The Bandwidth Manager 42, for example, may be responsible for setting up and tearing down bandwidth within the network and for controlling the access of individual calls to the bandwidth. The Bandwidth Manager 42 may also be responsible for installing the appropriate policy in Edge Routers 32 to govern media flows for each call.

As shown in FIG. 1, more than one IP network 20 (in this case, two IP networks 20) may be involved in the transmission of the communication 28 from one subscriber to another. Thus, the communication 28 to be relayed from Subscriber A to Subscriber B may be routed from one IP network 20 to another IP network 20 via Edge Routers 32 associated with each respective IP network 20.

Subscriber A operating a VoIP communication device 24 may also communicate with Subscriber C operating a traditional mobile or fixed telephone 26. For example, referring again to FIG. 1, the communication 28 may be transmitted from the IP network 20 associated with Subscriber A's service to a PSTN 22 providing service to Subscriber C. The communication 28 may be routed through a Signaling Gateway 44, which acts as a gateway between the Call Agent signaling and the SS7-based PSTN 22. The communication 28 may also be routed through a Trunking Gateway 46, which acts as a gateway between the carrier IP network 20 and the TDM-based PSTN 22. In other words, the Trunking Gateway 46 may provide transcoding from the packet-based VoIP network onto a TDM network. The Trunking Gateway 46 may be controlled by the Call Agent 34 using a device control protocol such as H.248 (Megaco) or MCP. Communication 28 from Subscriber A to Subscriber C may then be transmitted to a Phone Switch 48, such as a Class 5 Switch, to Subscriber C's telephone equipment 26.

Other network elements, not shown in FIG. 1, may include an Access Concentrator located in the service provider's network that terminates the service provider end of the WAN links, a Subscriber Gateway located at the customer premises that terminates the WAN link at the customer premises and may provide both voice ports and data connectivity, and a Bridge or Router located at the customer premises that terminates the WAN link at the customer premises. As previously mentioned, not all network elements may be present in a given VoIP communication system, and other network elements not mentioned here may be included as necessary to support the network architecture.

The processor 12 of the apparatus 10 is configured to communicate with various network elements, such as the ones previously described, over the respective IP networks 20 to obtain and store data regarding each respective network element. In FIG. 1, the communication of the processor 12 with the network elements connected to the IP networks 20 is represented by a double dashed line 50. For example, referring to FIG. 2, the processor 12 may communicate with one or more of the network elements connected to an IP network 20, including, for example, the Access Gateway 30, Edge Routers 32, Call Agents 34, Application Servers 36, Media Servers 38, Service Brokers 40, Bandwidth Managers 42, Signaling Gateways 44, Trunking Gateways 46, as well as VoIP communication devices 24, among other network elements. The processor 12 may also be configured to communicate with other network elements connected to other accessible IP networks 20.

Figure 2:
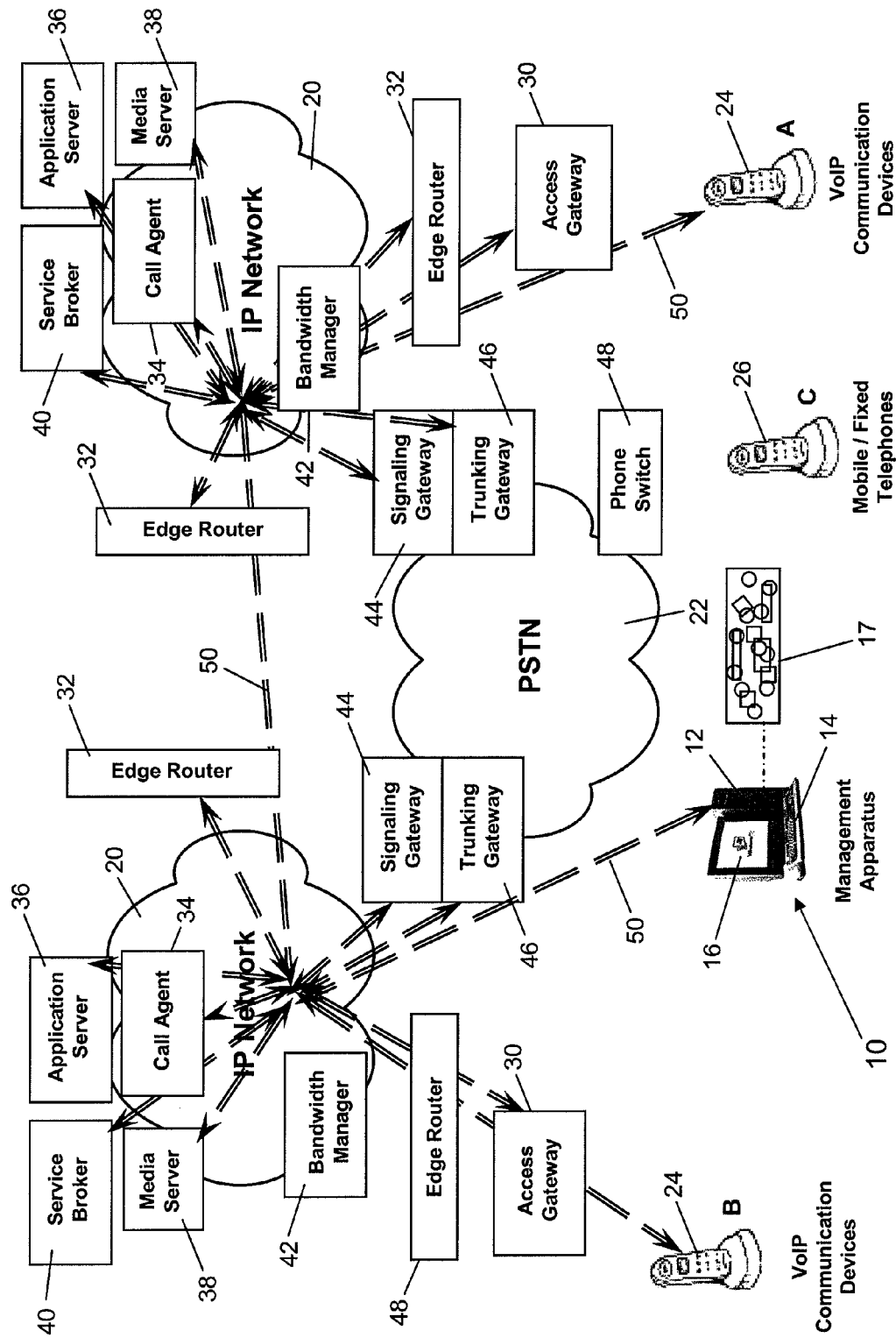
FIG. 2 is a schematic representation of the apparatus of FIG. 1 showing communication between a processor and the network elements.

The processor 12 may be configured to receive and store data from each network element automatically. For example, the processor 12 may be configured to communicate with certain network elements, such as Call Agents 34 and Bandwidth Managers 42, on a daily basis and to automatically receive and store requested data, such as call log details or bandwidth usage. Alternatively, or in addition, the processor 12 may be configured to receive an input and to receive and store data according to the input. For example, the processor 12 may include an input device 14, such as a keyboard, as shown in FIGS. 1 and 2, or a mouse, through which the processor 12 may receive an input from a user, such as a technician. In other words, a technician may use the input device 14 to specify the network elements from which to receive data and may also instruct the processor 12 as to how and where to store the data received.

As a further example, the technician may use the input device to select one of several modules available to the processor 12 which would instruct the processor 12 as to which network element to query for data, how to communicate with the network element selected, and what information to retrieve and store. The modules may be embodied, for example, as software stored in memory of the apparatus 10 and configured to be accessed and executed by the processor 12 to provide the instruction described herein. One such module, for example, may instruct the processor 12 to send a SIP packet to a VoIP communication device 24 requesting information from the VoIP communication device 24 regarding the device's configuration. Another module may access files from another system or database connected to the network. In other words, by selecting pre-programmed modules for directing operation of the processor 12, a user may obtain needed information from various network elements without personally having knowledge as to how to communicate with each network element. Among other things, the modules define the protocol for communication with a respective network element and translate between the protocol recognized by the processor 12 and the protocol of the network element. As previously mentioned, the processor 12 may receive and store the data upon receiving an input from a user, or the processor 12 may be configured to execute such modules periodically and thus receive and store data automatically.

The processor 12 may be configured to arrange the data received from various network elements in a database format, such as in tabular form. The processor 12 may relate the various pieces of data to other data according to one or more identifying aspects of a VoIP communication device 24. For example, data obtained from various network elements may be associated with a particular VoIP communication device 24 according to the IP address, Media Access Control (MAC) address, phone number, physical location, or assigned user of the VoIP communication device 24. In this way, although the data was received from various sources through various respective communication protocols, a user interested in viewing all or some of the information regarding a particular VoIP communication device 24 would generally be able to access the desired information together in one format, as will be further described below.

The processor 12 of the apparatus 10 may be configured to access and return portions of the stored data according to an input received. For example, a technician may need to view data regarding the configuration of a VoIP communication device 24 connected to the network. In this case, the technician may either execute a module that would instruct the processor 12 to communicate with the Call Agent 34, for example, to obtain such information, as previously described, or the technician may instruct the processor to access previously stored data received from the Call Agent 34 showing similar information. In other words, the technician may use the input device 14 to provide the processor 12 with criteria, such as a telephone number associated with a particular VoIP communication device 24. As a result, the processor 12 may return data matching the criteria that may have been received from the respective Call Agent 34 and stored the night before. The historical data may be displayed along with a note to the technician that the data may be updated at the technician's request, which would trigger execution of the respective module. Other functions may also be performed, as provided in U.S. Ser. No. 13/116,799, entitled "Apparatus for Remotely Rebooting VoIP Communication Devices and an Associated Method and Computer Program Product" (Verizon Reference Number 20060247), filed concurrently, the content of which is incorporated by reference herein in its entirety.

Figure 3:
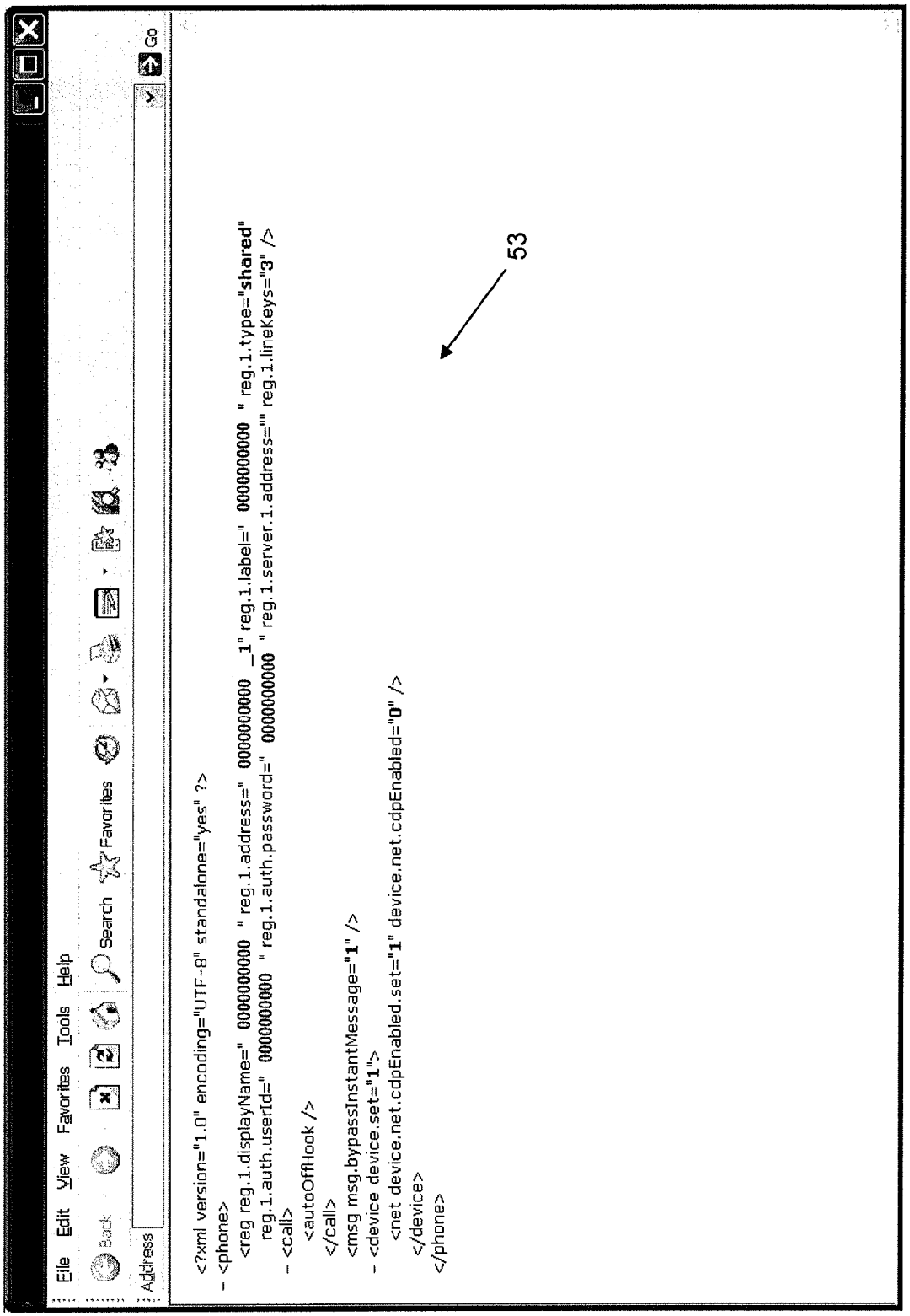
FIG. 3 shows an example of a screen showing VoIP communication device profiles generated by execution of a computer program product in accordance with one embodiment.

Data regarding other network elements may also be accessed and returned according to the input provided as criteria by a user. For example, such data may include IP addresses, phone numbers, MAC addresses, device types, registration statuses, and other information regarding one or more particular VoIP communication devices 24. In addition, the results of the search may also provide links to access other data concerning the particular VoIP communication devices 24, such as the currently-loaded configuration or profile 53 (see FIG. 3), the configuration information stored by the network application servers, and any logged data associated with each respective device 24, such as calling events.

Figure 4:
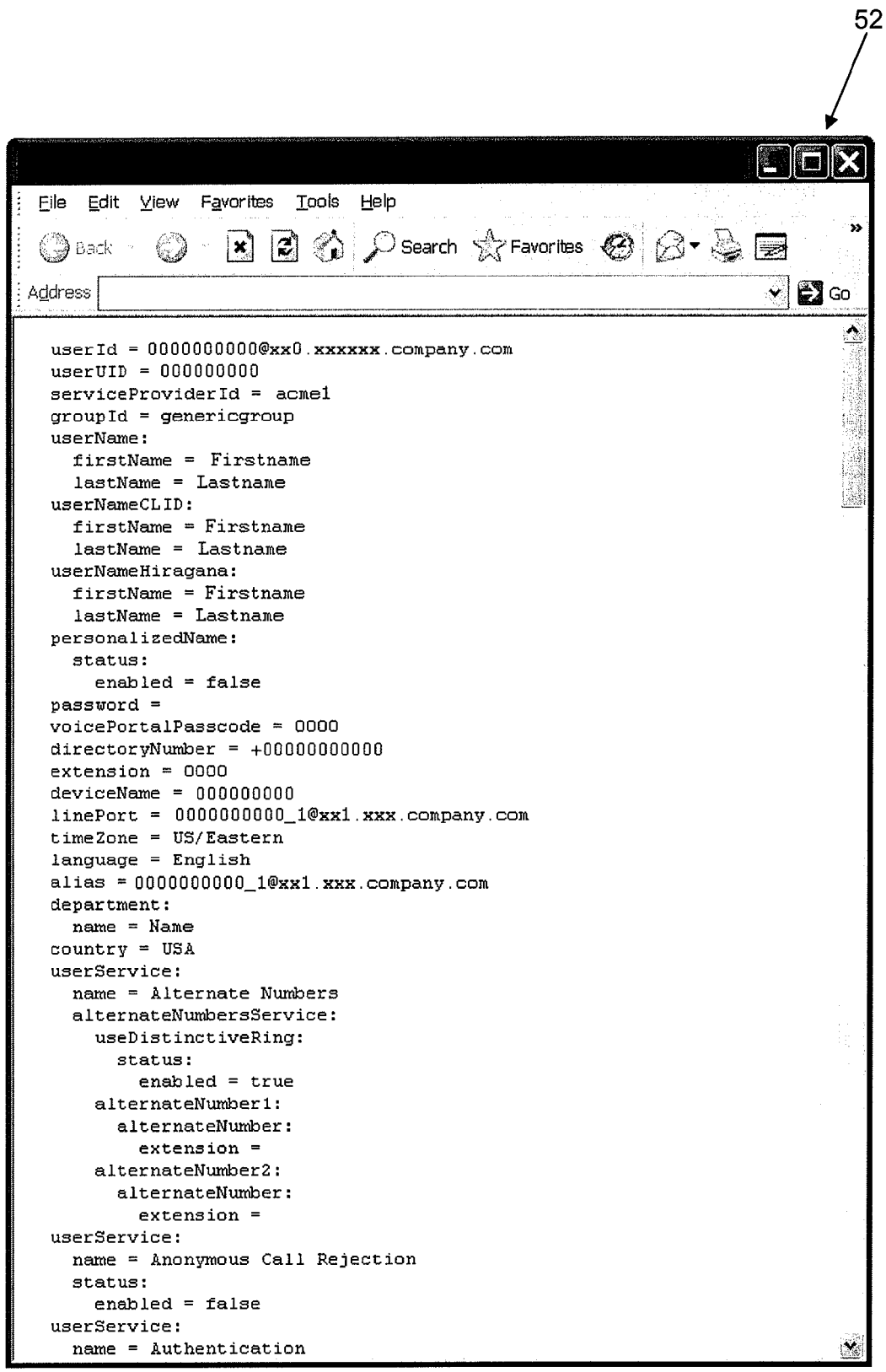
FIG. 4 shows an example of a screen showing results of a search generated by execution of a computer program product in accordance with one embodiment.

The apparatus 10 may include a monitor 16, as shown in FIGS. 1 and 2, onto which the processor 12 may display the results of a search of the stored data for criteria that has been received as input. For example, the processor 12 may generate and display upon the monitor a screen 52, as illustrated in FIG. 4, showing data received from a Call Agent 34 as a result of a previous communication between the processor 12 and the Call Agent 34 associated with a VoIP communication device 24 of interest. The information accessed and returned in this example may include whether the VoIP communication device 24 was connected to a dial tone, the rights and privileges of the communication device 24, and other options and features associated with the particular communication device 24.

Figure 5:
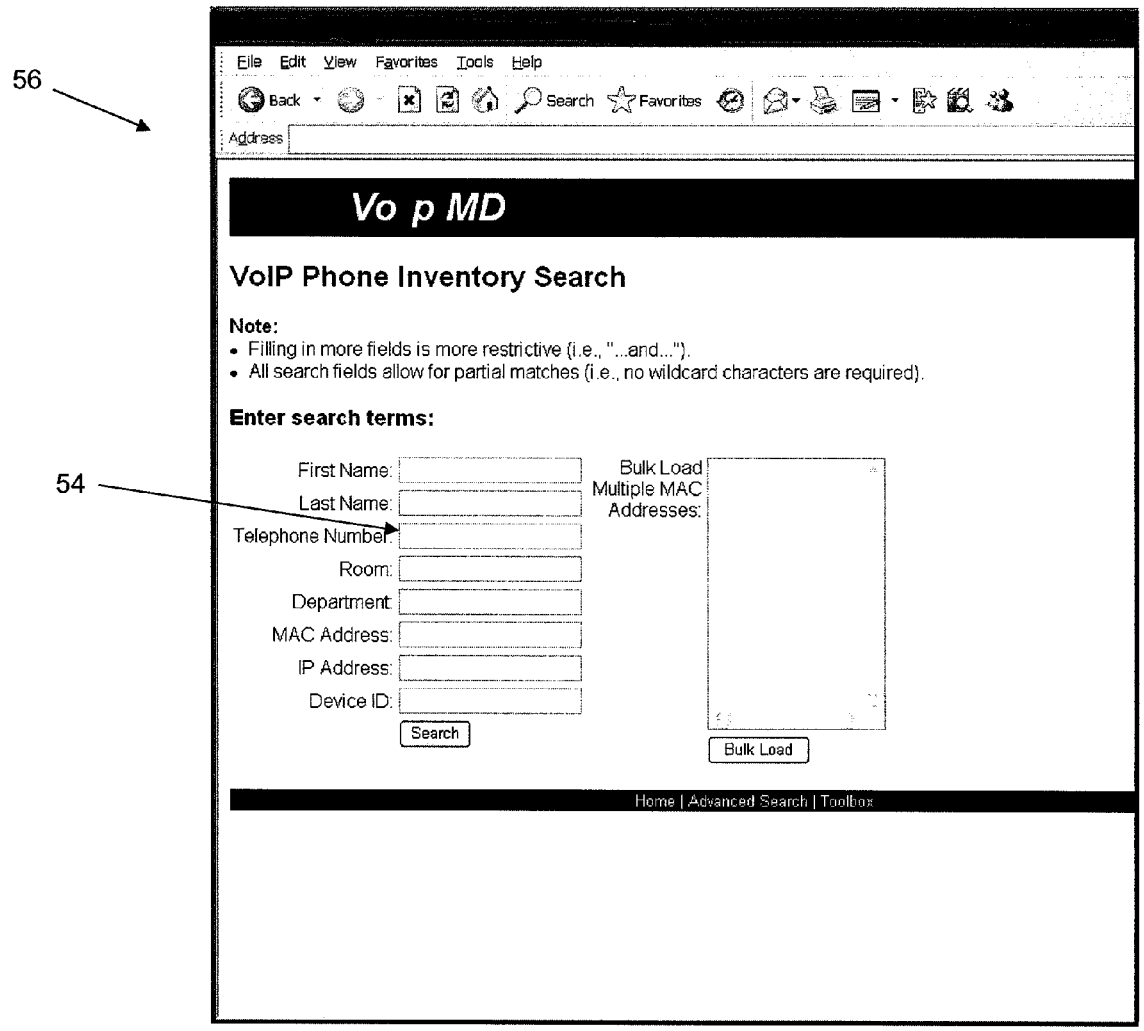
FIG. 5 shows an example of a search criteria input screen generated by execution of a computer program product in accordance with one embodiment.

As a further example, a technician may provide a telephone number of a particular VoIP communication device 24 as an input in a text field 54 on a screen 56, illustrated in FIG. 5, that is displayed on the monitor 16. The search may return various data, as previously described, according to the input and the information available to be searched. The results may be displayed in a table 58, as illustrated in FIG. 6.

The processor 12 may also be configured to apply one or more rules to the data received and stored in order to determine at least one characteristic of the data. For example, the processor 12 may be configured such that if data is received from a particular network element under certain conditions specified by a rule, the respective data is characterized according to the rule. The data may be characterized as valid or invalid, the relative importance with respect to other related data may be indicated, or some other logical relationship among the various pieces of related data may be established according to such rules. The processor 12 may, for example receive data from a Call Agent 34 regarding the phone log associated with a particular VoIP communication device 24.

The processor 12 may also attempt to receive data from the VoIP communication device 24 regarding the status of the device 24. A rule in this example may instruct the processor 12 to characterize the data from the Call Agent 34 as invalid if the status returned from the VoIP communication device 24 indicates that the device was "off-line" during the relevant time period. In this way, a technician, for example, evaluating a reported problem with the particular VoIP communication device 24 by examining the associated phone log would be alerted to the fact that a condition existed which rendered the received phone log data invalid. In other words, instead of manually analyzing each potential source of an error or reported problem, the processor 12 of the apparatus 10 may be configured to automatically classify at least some of the data received such that the amount of analysis required is reduced.

In addition to receiving and storing data, the processor 12 may be configured to transmit data to one or more network elements. For example, the processor 12 may transmit profiles or configuration information pertaining to particular VoIP communication devices 24 to the devices 24 themselves or to the related network elements in order to update the respective network element and maintain proper communication between the various elements. Similarly, updated files and/or software may be transmitted to various network elements to correct a problem, such as improper connections between subscribers, or update the system. For example, updated phone log software that allows a Call Agent 34 to record more details associated with each call, reflecting an improvement of the system for billing purposes, may be transmitted to the Call Agents 34 connected to the system by the processor 12. In addition, the processor 12 may obtain data, as previously described, from the recently upgraded Call Agent 34 after transmitting the software to monitor whether the upgrades were successfully executed.

The processor 12 may be configured to report a condition of one or more network elements. For example, the processor 12 may be configured to notify a user, such as a technician, upon receiving data indicating a certain condition of the network element with which the processor 12 is communicating. Various conditions may be reported to a user, depending on the configuration of the processor 12. A technician, for example, may be notified of a failure of the processor 12 to receive data from a particular network element (e.g., a failure of the network element to provide the requested data). The technician or other user may also be notified if the processor 12 receives data indicating that a particular network element is off-line or has experienced an error, or if the data received by the processor 12 meets a certain criteria (e.g., the date of the last upgrade received by the network element is earlier than a specified date). In addition, the processor may notify a user regarding the attempted transmittal of data to a network element, such as whether a VoIP communication device 24 profile upgrade was successfully executed.

Figure 7:
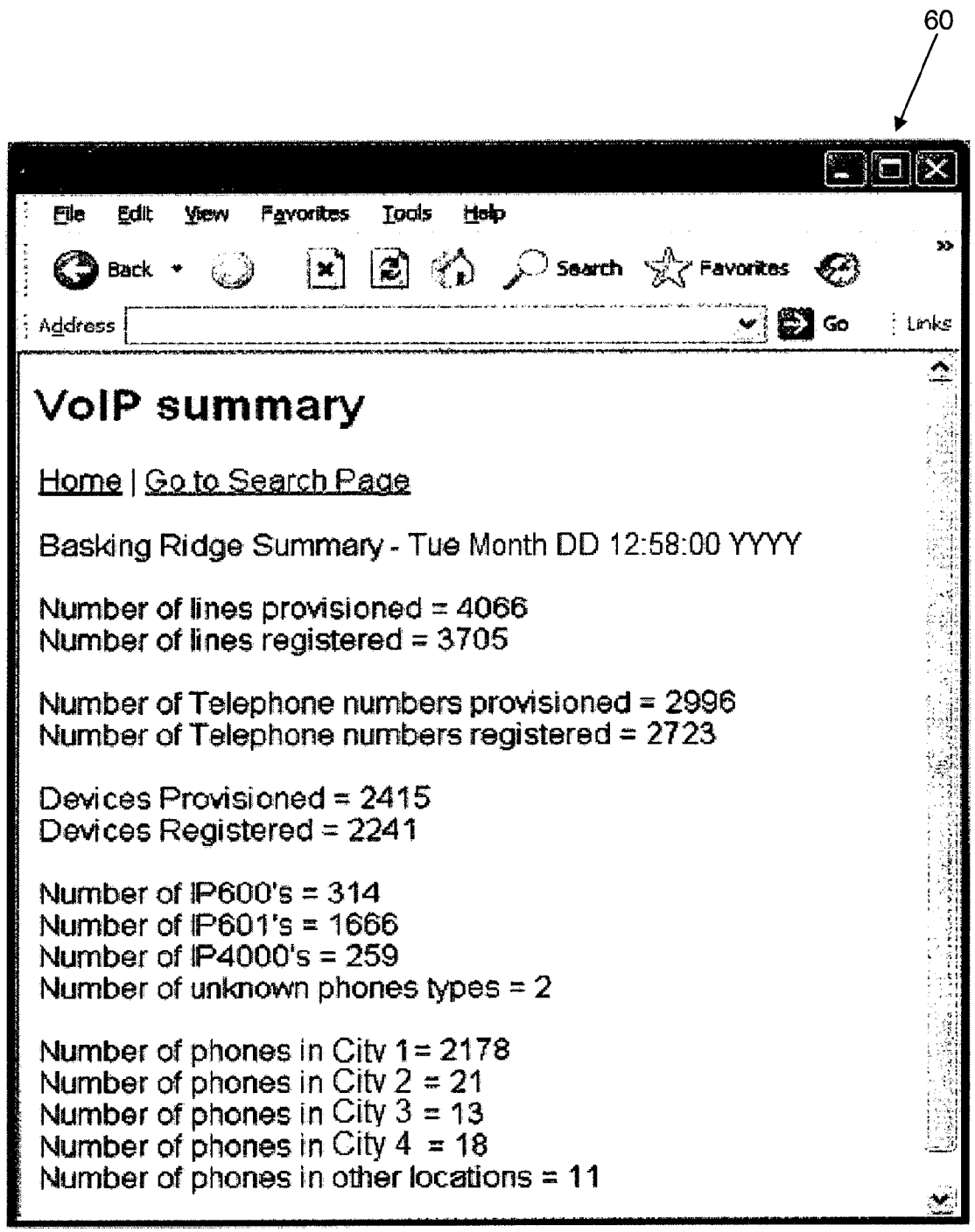
FIG. 7 shows an example of a screen showing a summary report generated by execution of a computer program product in accordance with one embodiment.

The report may be generated automatically as an e-mail, text message, user interface, or other form of notification and may contain varying levels of detail regarding the network elements associated with the condition. For example, the report may provide a list of the VoIP communication devices 24 or other network elements associated with the condition, the date and time the condition occurred, as well as other details regarding the condition. Similarly, a summary report 60 showing data obtained from a collection of network elements may be displayed, as illustrated in FIG. 7.

The apparatus 10 may also include a display 17, illustrated in FIGS. 1 and 2, configured to visually present information regarding the condition of one or more network elements. The display 17 may, for example, include Light-Emitting Diodes (LEDs) associated with each network element or groups of network elements to visually relate information on the depicted network elements. For example, a lit green LED may indicate that the respective network element is on-line and properly functioning, whereas a lit red LED may indicate that the respective network element is off-line or experiencing an error condition. Similarly, the display 17 may be a liquid crystal display depicting one or more network elements of interest and illustrating a condition of the system. Such a display 17 may, for example, illustrate the transmittal of data between various network elements and the processor 12 using animated arrows moving in the direction of data flow. Likewise, a failure to receive data from a particular network element may be shown on the display 17 by a flashing pictorial representation of the respective element or related text describing the failure. The display 17 may visually present one or more conditions related to the one or more network elements monitored and in some embodiments may act as an input device 14, allowing a user to instruct the processor 12 as previously described.

Figure 8:
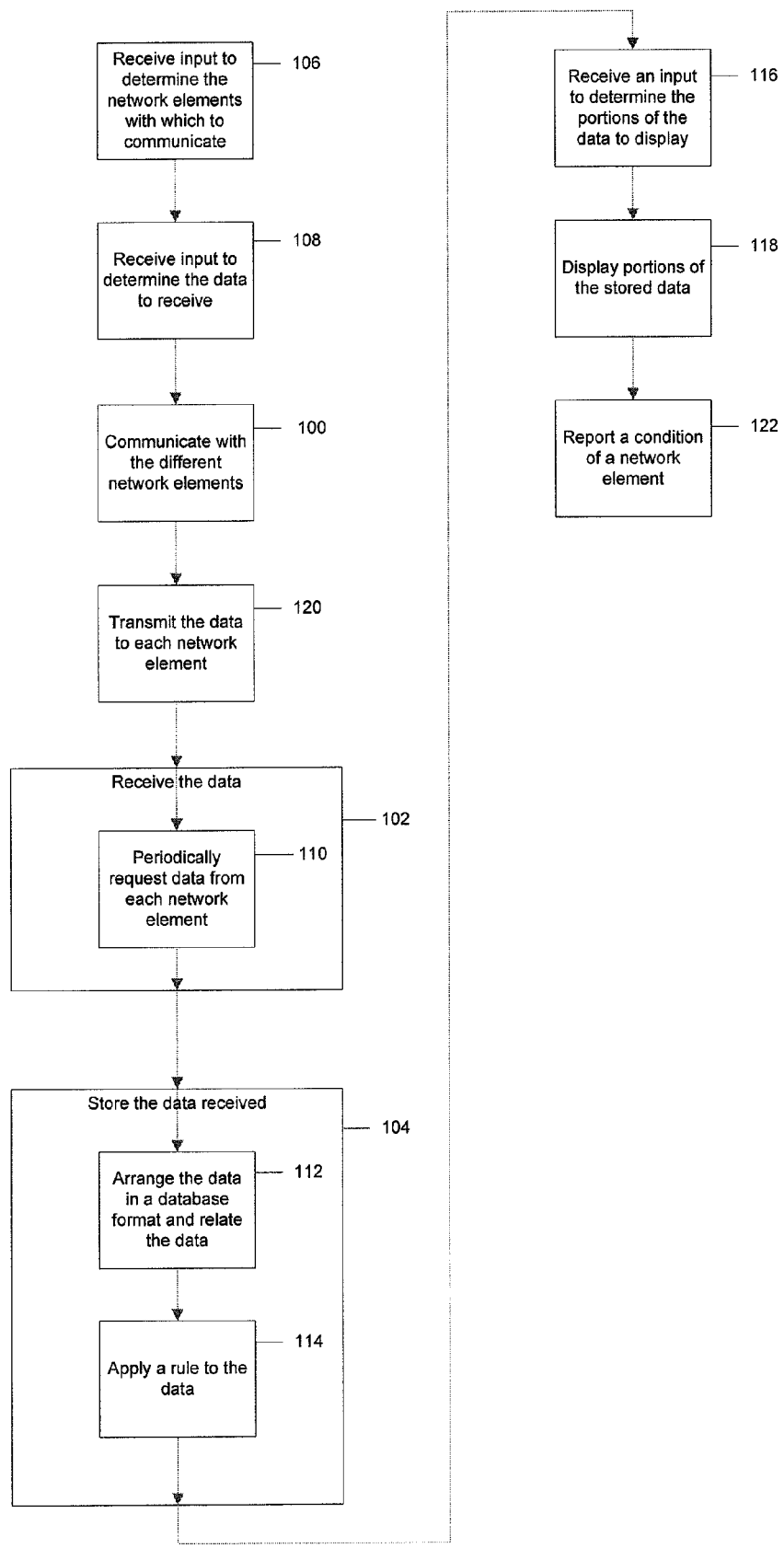
FIG. 8 is a flow chart illustrating embodiments of a method of remotely managing network elements of a VoIP communication system.

In other embodiments, a method for remotely managing network elements of a VoIP communication system is provided. Referring to FIG. 8, communication is initially established with multiple different network elements of a VoIP communication system, as previously described. Data is then received from each network element with which communication was made, and the received data is then stored. See FIG. 8, blocks 100-104.

Input regarding the network elements with which to communicate may be received prior to the communication, for example through an input device 14 such as a keyboard. See block 106. Alternatively, the communication may be conducted automatically with all network elements or only certain network elements, according to a prior configuration, and data may be received according to automatic, periodic requests made to each network element according to such configuration. See block 110. For example, one configuration may call for requests to be made each night at midnight to all connected Call Agents 34 for phone log data.

Input may also be received regarding the type of data to be obtained from the respective network elements. See block 108. For example, the input may specify that data is to be received pertaining to a configuration of a particular network element, the status of the network element, or the prior activities of the network element, among many other items of information.

Regardless of how the request for data is made, once the data is received the data may be arranged in a database format, for example in two-dimensional or three-dimensional tables. Each item of data may be related to other items of data based on one or more identifying aspects of a VoIP communication device. See block 112. For example, data may be arranged such that information regarding the configurations, profiles, and privileges of a particular VoIP communication device is related to a telephone number, MAC address, or IP address of the VoIP communication device. One or more rules may also be applied to the data to determine which data to store and how to store the data. See block 114. For example, a rule may specify that certain data received under particular conditions (e.g., while a system is off-line) should be discarded. Alternatively, a rule may specify that all data related to a particular system event (e.g., a system failure) be stored in the same location or otherwise be related.

In addition to inputs regarding the network elements with which to communicate and the type of data to receive, an input may also be received to determine portions of previously stored data to display. See block 116. For example, input may be received from a user in the form of criteria, such as an IP address, user name, location, or telephone number of a VoIP communication device. In response to receiving this input, portions of the stored data meeting the criteria, such as stored data that has been related to the IP address provided as an input, may be displayed, as previously described. See block 118.

Data may also be transmitted to each network element, as shown in block 120. For example, updated profiles for VoIP communication devices may be transmitted to the respective devices, and other file upgrades and new software may be transmitted to other network elements, as previously described. Although transmitting data to the network elements is shown as occurring before data is received, data may be transmitted to the network elements at any point following communication with the various network elements involved in the transaction.

Finally, a condition of one or more network elements may be reported. See block 122. As discussed, such conditions may include a status of the network element (e.g., off-line or connected), an error condition, an activity (e.g., upgraded profiles downloaded), or an event (e.g., server down). Reports may take the form of an e-mail, text message, user interface, or any other form of notification and may include further functionality, such as the option to access stored data or re-transmit files or requests for data to the respective network element or elements. Reports may also take the form of summary reports for collections of network elements, as previously described.

Figure 9:
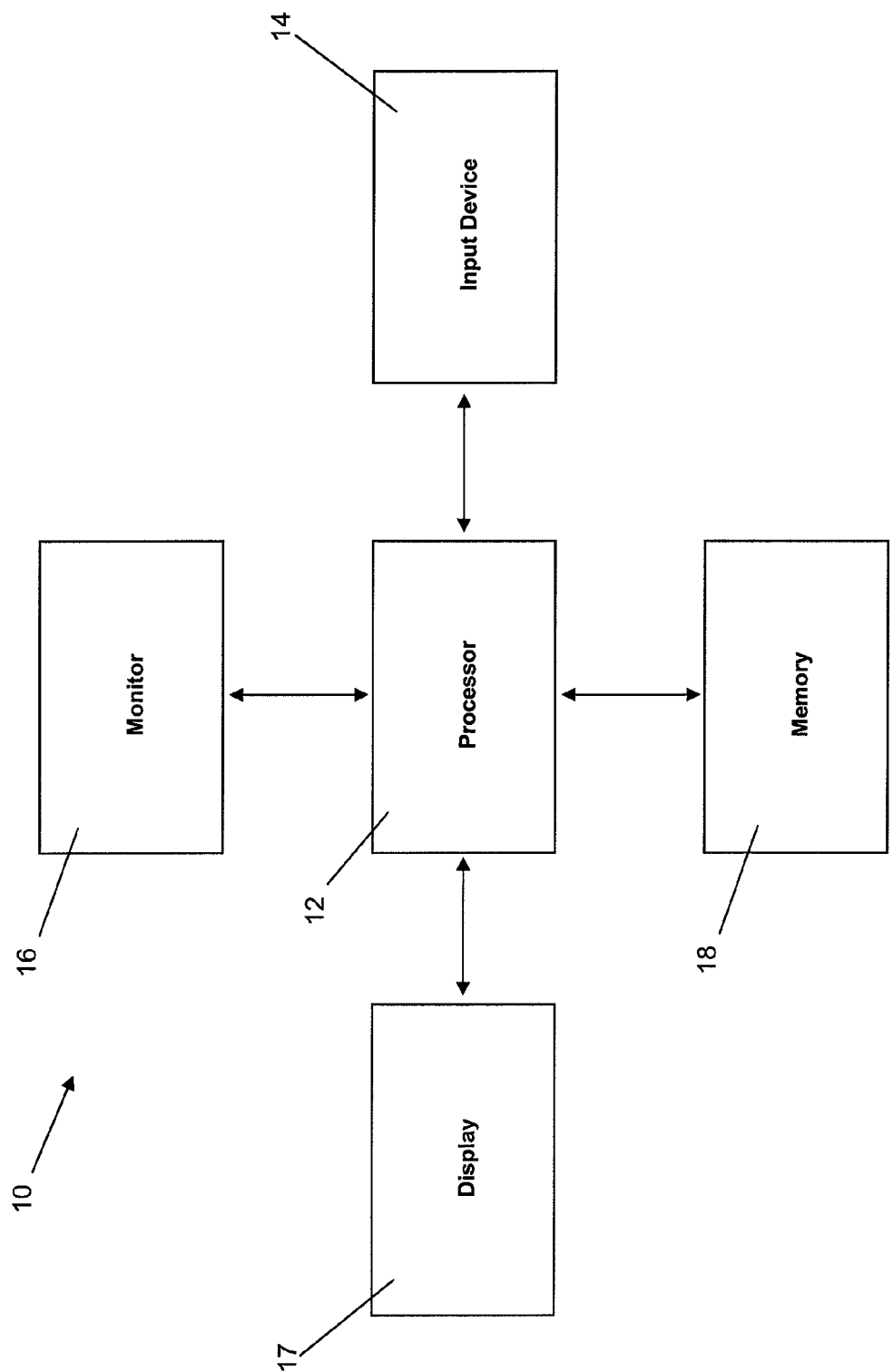
FIG. 9 is a block diagram of one embodiment of an apparatus for remotely managing network elements of a VoIP communication system.

It is understood that the operations described for the illustrated methods of FIG. 8 may be performed through hardware, software, or combination thereof. Therefore embodiments may take the form of hardware systems and/or apparatuses, software, or combinations thereof. As an example, embodiments may include a computer program product that includes a computer-readable storage medium (e.g., memory) and one or more executable portions (e.g., software) stored by the computer-readable storage medium for performing the operations described herein upon execution thereof. Referring to FIG. 9, for example, the executable portions may be stored in a memory 18 of the apparatus 10 such that the processor 12 may access and execute the executable portions of the computer program product in order to perform the functions described herein including, for example, those depicted in FIG. 8.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. An apparatus comprising:
a processor configured to communicate with a plurality of different network elements of a Voice over Internet Protocol (VoIP) communication system, wherein the plurality of different network elements includes a VoIP communication device and at least one network element communicatively disposed between the processor and the VoIP communication device in the VoIP communication system; and
wherein the processor is configured to receive and store network element data generated by the at least one network element communicatively disposed between the processor and the VoIP communication device in the VoIP communication system,
wherein the processor is configured to amply at least one rule to the network element data to determine at least one validity characteristic of the network element data and to store the network element data based on the application of the at least one rule, wherein the validity characteristic of the network element data is automatically classified by characterizing the network element data as invalid if a status data received from the VoIP communication device indicates that the VoIP communication device was off-line during a relevant time period.

2. The apparatus of claim 1, wherein the processor is configured to communicate with the at least one network element from the group consisting of a call agent, a Session Initiation Protocol (SIP) server, a SIP client, a service broker, an application server, a media server, a signaling gateway, a trunking gateway, an access gateway, an access concentrator, a bandwidth manager, an edge router, a subscriber gateway, a bridge, and a router.

3. The apparatus of claim 1, wherein the processor is configured to receive and store the network element data automatically.

4. The apparatus of claim 1, wherein the processor is configured to receive an input, and the network element data is received and stored according to the input.

5. The apparatus of claim 4, wherein the processor is configured to access and return portions of the stored network element data according to the input received.

6. The apparatus of claim 1, wherein the processor is configured to arrange the network element data in a database format and to relate the network element data based on at least one identifying aspect of the VoIP communication device from the group consisting of an Internet Protocol (IP) address, Media Access Control (MAC) address, phone number, physical location, and assigned user of the VoIP communication device.

7. The apparatus of claim 1, wherein the processor is configured to transmit data to the at least one network element communicatively disposed between the processor and the VoIP communication device in the VoIP communication system.

8. The apparatus of claim 1, wherein the processor is configured to report a condition of the at least one network element communicatively disposed between the processor and the VoIP communication device in the VoIP communication system.

9. The apparatus of claim 1, further comprising a display configured to visually present information on at least one condition of the at least one network element communicatively disposed between the processor and the VoIP communication device in the VoIP communication system.

10. The apparatus of claim 1, wherein the processor is further configured to communicate with the at least one network element communicatively disposed between the processor and the VoIP communication device by accessing at least one of an IP address, a phone number, a Media Access Control (MAC) address, a device type, a registration status, a configuration, and a profile of the at least one network element.

11. The apparatus of claim 1, wherein the processor is further configured to identify that at least one network element in the plurality of different network elements has experienced an error.

12. The apparatus of claim 1, wherein the processor is further configured to communicate with the at least one network element communicatively disposed between the processor and the VoIP communication device by using a communication protocol specific to the at least one network element to access network element data stored in the at least one network element.

13. A method comprising:
communicating, by at least one processor, with a plurality of different network elements of a Voice over Internet Protocol (VoIP) communication system, wherein the plurality of different network elements includes a VoIP communication device and at least one network element communicatively disposed between the at least one processor and the VoIP communication device in the VoIP communication system;
receiving, by the at least one processor, network element data generated by the at least one network element communicatively disposed between the at least one processor and the VoIP communication device in the VoIP communication system;
applying, by the at least one processor, at least one rule to the network element data to determine at least one validity characteristic of the network element data, wherein the validity characteristic of the network element data is automatically classified by characterizing the network element data as invalid if a status data received from the VoIP communication device indicates that the VoIP communication device was off-line during a relevant time period; and
storing, by the at least one processor, the network element data received from the at least one network element communicatively disposed between the at least one processor and the VoIP communication device in the VoIP communication system based on the application of the at least one rule.

14. The method of claim 13, wherein receiving the network element data comprises periodically requesting network element data from the at least one network element communicatively disposed between the at least one processor and the VoIP communication device in the VoIP communication system.

15. The method of claim 13, further comprising transmitting data to the at least one network element communicatively disposed between the at least one processor and the VoIP communication device in the VoIP communication system.

16. The method of claim 13, further comprising receiving an input to determine the at least one network element communicatively disposed between the at least one processor and the VoIP communication device in the VoIP communication system from which to receive the network element data.

17. The method of claim 13, further comprising receiving an input to determine the network element data to receive.

18. The method of claim 13, further comprising displaying portions of the stored network element data.

19. The method of claim 18, wherein displaying portions of the stored network element data comprises receiving an input to determine the portions of the stored network element data to display.

20. The method of claim 13, wherein storing the network element data comprises arranging the network element data in a database format and relating the network element data based on at least one identifying aspect of the VoIP communication device.

21. The method of claim 13, further comprising reporting a condition of at least one network element included in the plurality of different network elements.

22. A computer program product comprising a non-transitory computer-readable storage medium having computer-readable program code portions stored therein, the computer-readable program code portions comprising:
a first executable portion for communicating, by at least one processor, with at least one network element of a Voice over Internet Protocol (VoIP) communication system including at least one network element communicatively disposed between the at least one processor and a VoIP communication device in the VoIP communication system;
a second executable portion for receiving, by the at least one processor, network element data generated by the at least one network element communicatively disposed between the at least one processor and the VoIP communication device in the VoIP communication system;
a third executable portion for applying, by the at least one processor, at least one rule to the network element data to determine at least one validity characteristic of the network element data, wherein the validity characteristic of the network element data is automatically classified by characterizing the network element data as invalid if a status data received from the VoIP communication device indicates that the VoIP communication device was off-line during a relevant time period; and
a fourth executable portion for storing, by the at least one processor, the network element data received from the at least one network element communicatively disposed between the at least one processor and the VoIP communication device in the VoIP communication system based on the application of the at least one rule.

23. The computer program product of claim 22, further comprising a fifth executable portion for transmitting data to the at least one network element communicatively disposed between the at least one processor and the VoIP communication device in the VoIP communication system and a sixth executable portion for reporting a condition of at least one network element of the VoIP communication system.

24. The computer program product of claim 22, further comprising a fifth executable portion for receiving an input to determine the at least one network element communicatively disposed between the at least one processor and the VoIP communication device in the VoIP system from which to receive the network element data and a sixth executable portion for receiving an input to determine the network element data to receive.

25. The computer program product of claim 22, further comprising a fifth executable portion for displaying portions of the stored network element data and a sixth executable portion for receiving an input to determine the portions of the stored network element data to display.

26. The computer program product of claim 22, further comprising a fifth executable portion for arranging the network element data in a database format and relating the network element data based on at least one identifying aspect of the VoIP communication device.

* * * * *